May 23, 1967 W. J. DOBBINS ETAL 3,321,564
METHOD FOR THERMALLY CONDITIONING BLOW MOLDED MACHINE ELEMENTS
Original Filed Oct. 31, 1962 4 Sheets-Sheet 2

INVENTORS
WALTER JAMES DOBBINS
OSCAR FREDERICK ECKLUND
EUGEN FRANZ POLKA

By Robert P. Auber
ATTORNEY

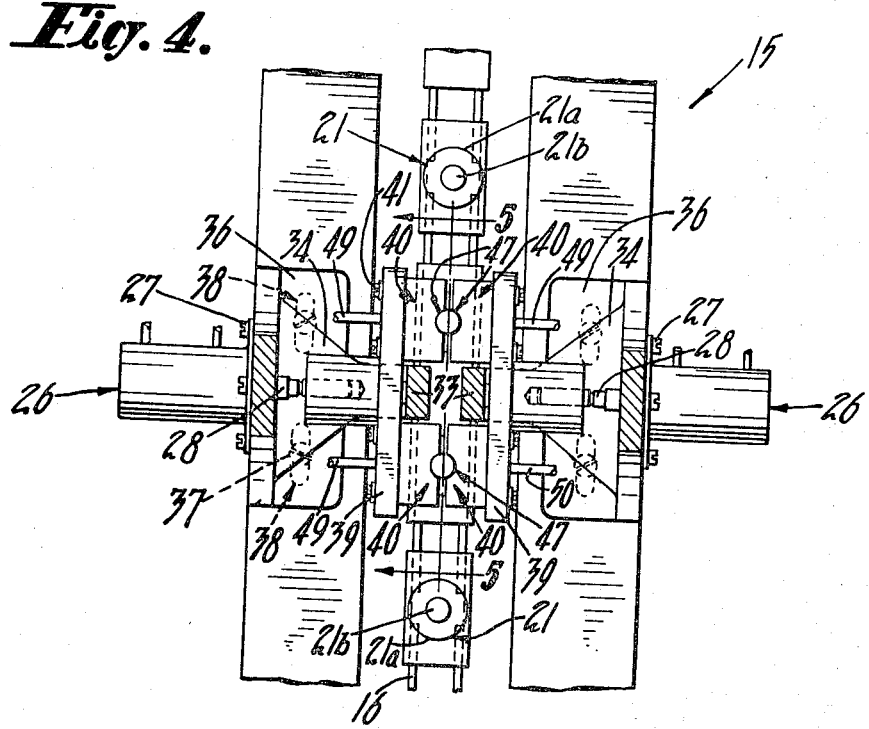
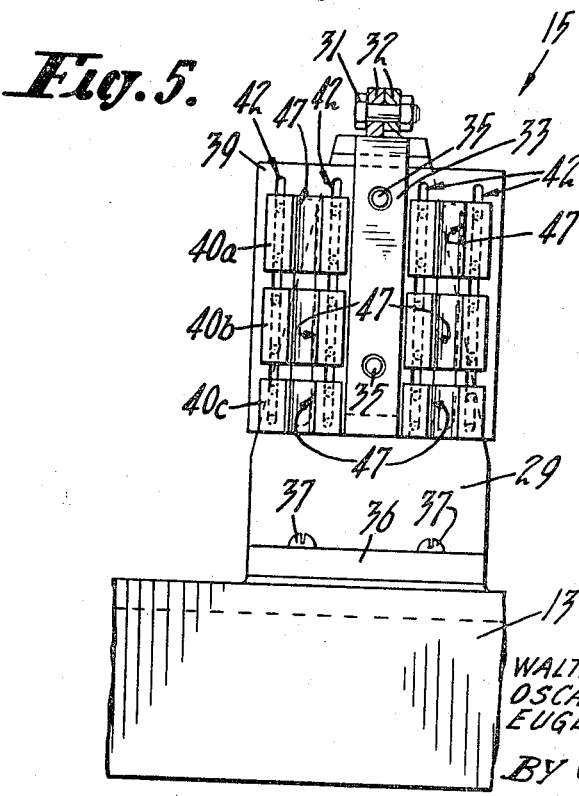

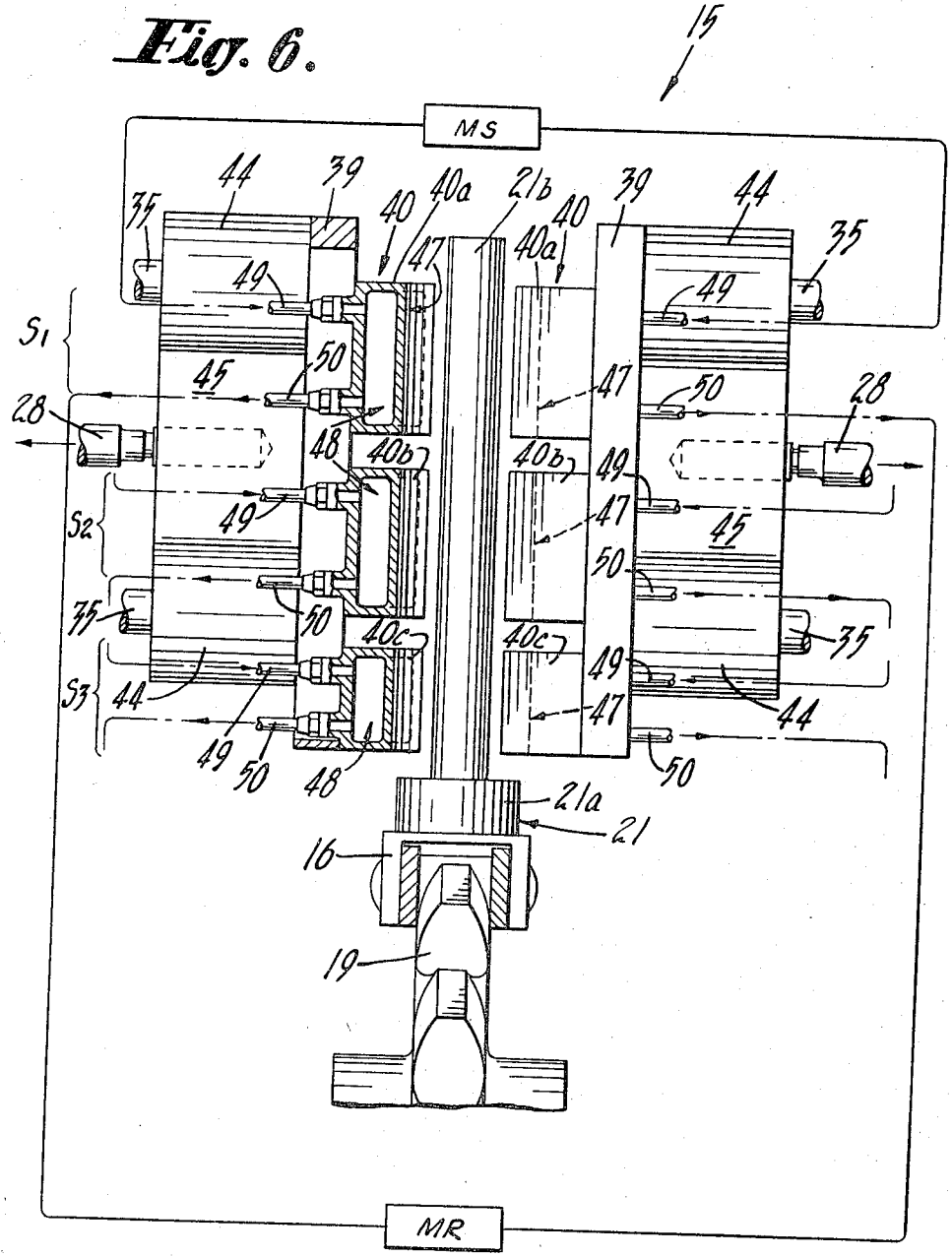

United States Patent Office 3,321,564
Patented May 23, 1967

3,321,564
METHOD FOR THERMALLY CONDITIONING BLOW MOLDED MACHINE ELEMENTS
Walter James Dobbins, Lake Zurich, Oscar Frederick Ecklund, Barrington, and Eugen Franz Polka, Algonquin, Ill., assignors to American Can Company, New York, N.Y., a corporation of New Jersey
Original application Oct. 31, 1962, Ser. No. 234,437, now Patent No. 3,186,028, dated June 1, 1965. Divided and this application May 11, 1965, Ser. No. 470,279
9 Claims. (Cl. 264—97)

This application is a divison of our copending application Ser. No. 234,437 filed Oct. 31, 1962, now Patent No. 3,186,028.

This invention relates to the manufacture of hollow, thin-walled plastic articles and, more particularly, to a method of and apparatus for thermally conditioning certain machine elements of bottle blowing machinery to improve the quality of the molded article produced thereby.

Blown plastic bottles are customarily manufactured by one of the two techniques known in the trade as extrusion-blowing and injection-blowing, or by some combination of the two. The injection-blowing technique, to which the present invention is specifically directed, differs from extrusion-blowing in that the preform or blank, ordinarily referred to as the parison and from which the bottle is finally blown, is formed individually in a separate injection mold to a desired configuration rather than being a simple cylindrical extrusion. Injection molding the parison, wherein a heat-softened plastic material, such as polyethylene, is charged into the injection mold under hydrostatic pressure, has several advantages to recommend it over the extrusion technique. Among these are greater equipment flexibility and reduction of imperfections normally attributable to such extrusion-blow characteristics as neck-down, irregular extrusion temperature and viscosity, and the pinch or weld line required to close the end of an extruded parison. Additionally, the injection-blow technique provides a more convenient arrangement for effecting differential cooling of the neck end of the parison, a practical and efficient carrier mechanism for transferring the molded parison to the blowing mold, and the ability to shape the parison with any desired cross-sectional geometry as a means to achieve some control over the distribution of the plastic material in the walls of the finished bottle.

Injection-blow machinery has reduced a fairly advanced stage of refinement in that high-speed automatic operations have been developed by which the unit rate of production is commercially acceptable. In many of the systems currently in operation, the parison mold consists of outer mold sections, usually segmented and pivotally or slidably actuated, and a core pin-thread plate assembly operatively associated with the outer mold to define a confined mold cavity. The molded parison, once formed over the core pin, is removed from the injection mold and transferred, usually while still retained on the core pin, to the blowing mold where it is inflated to the finished bottle shape. In some operations, the core pin also functions as the blowing pin, it being provided with a central passage and a valve mechanism for admitting a pressurized fluid to the interior of the parison to inflate it in the blowing mold.

It is generally recognized by those skilled in the injection-blow art that the temperature of the core pins at the various stages of operation is a critical variable in the successful operation of blow molding machinery. In recognition of the problems of the chilling effect of the core pins during the start-up period and overheating after prolonged operation, the general approach in the prior art has been to provide some means for internal circulation in an effort to maintain the core pins at a relatively constant and uniform temperature.

It has only recently been discovered, however, that the thermal characteristics of the core pin elements in an automatic injection-blow operation are not uniform and therefore not completely susceptible to regulation by a strictly uniform tempering system. It has been observed that, after prolonged operation during which the core pins are repeatedly subjected to hot plastic at temperatures as high as 250° F. and under pressure commonly in the range of 15,000–20,000 p.s.i., the core pins develop erratic and non-uniform temperature profiles having patterns of local hot and relatively cold spots throughout its length. The explanation for this phenomenon is still debatable, but it is presently believed that the flow pattern of the molten plastic as it fills the parison mold may have a contributing effect. Also, where the parison itself is axially contoured to provide greater volume of plastic in select locations in its annular wall, these heavier regions tend to retain heat longer and would thereby tend to locally raise the core pin temperature in the vicinity of these regions.

Uniform tempering, such as by internal circulation, is not entirely satisfactory because it is virtually impossible to smooth out or remove an erratic temperature profile within a practical tempering time interval with such a system. This would merely lower the temperature of the core pin more or less uniformly throughout its length so that the local spots of temperature variation, although reduced in level, still remain. The result is that the parison, as it takes a set on the core pin, may undergo excessive "crawling" or shrinkage tending to thin out or rupture its tip end and/or occasionally it may stick to the core pin instead of peeling away in a clean manner when inflated in the blowing mold, in either case producing imperfections and a high discard rate. This situation indicates a need for an improved system of core pin tempering to ensure continuous operation, improve bottle quality, and reduce the need for constant attention by the machine operator.

An object of the present invention, therefore, is to improve on the prior art in regulating the temperature variables in injection-blow machinery.

Another object of this invention is to provide an improved method of and means for thermally conditioning the core pin element of injection-blow machinery.

Still another object of this invention is to provide a method of and means for establishing a predetermined temperature gradient on the core pin element of molding machinery during the operating cycle.

Yet another object of this invention is to provide a simple, practical and efficient method of and means for regulating within desired limits the temperature profile of the core pin elements of high-speed, automatic molding machinery.

Numerous other objects and advantages of the invention will be apparent as it is better understood from the following description, which, taken in connection with the accompanying drawings, discloses a preferred embodiment thereof.

To the accomplishments of these objects, the present invention contemplates the provision in an injection-blow machine of tempering means arranged in the path of travel of the core pins as they move from position to position during the operating cycle, the tempering means being adapted to be disposed about successive core pins and impose thereon, in aggregate effect, a predetermined temperature gradient within that portion of the time cycle during which each core pin moves through the tempering means prior to entering the injection mold station of the machine.

Referring to the drawings:

FIGURE 4 is a top plan iew of that portion of the apparatus shown in FIGURE 2, with parts broken away.

FIGURE 5 is a sectional view taken substantially along line 5—5 of FIG. 4.

FIGURE 6 is a schematic view shown partially in section, illustrating the same portion of the apparatus as shown in FIGURE 2 and showing in enlarged detail the operational features of the present invention.

Figure 1:
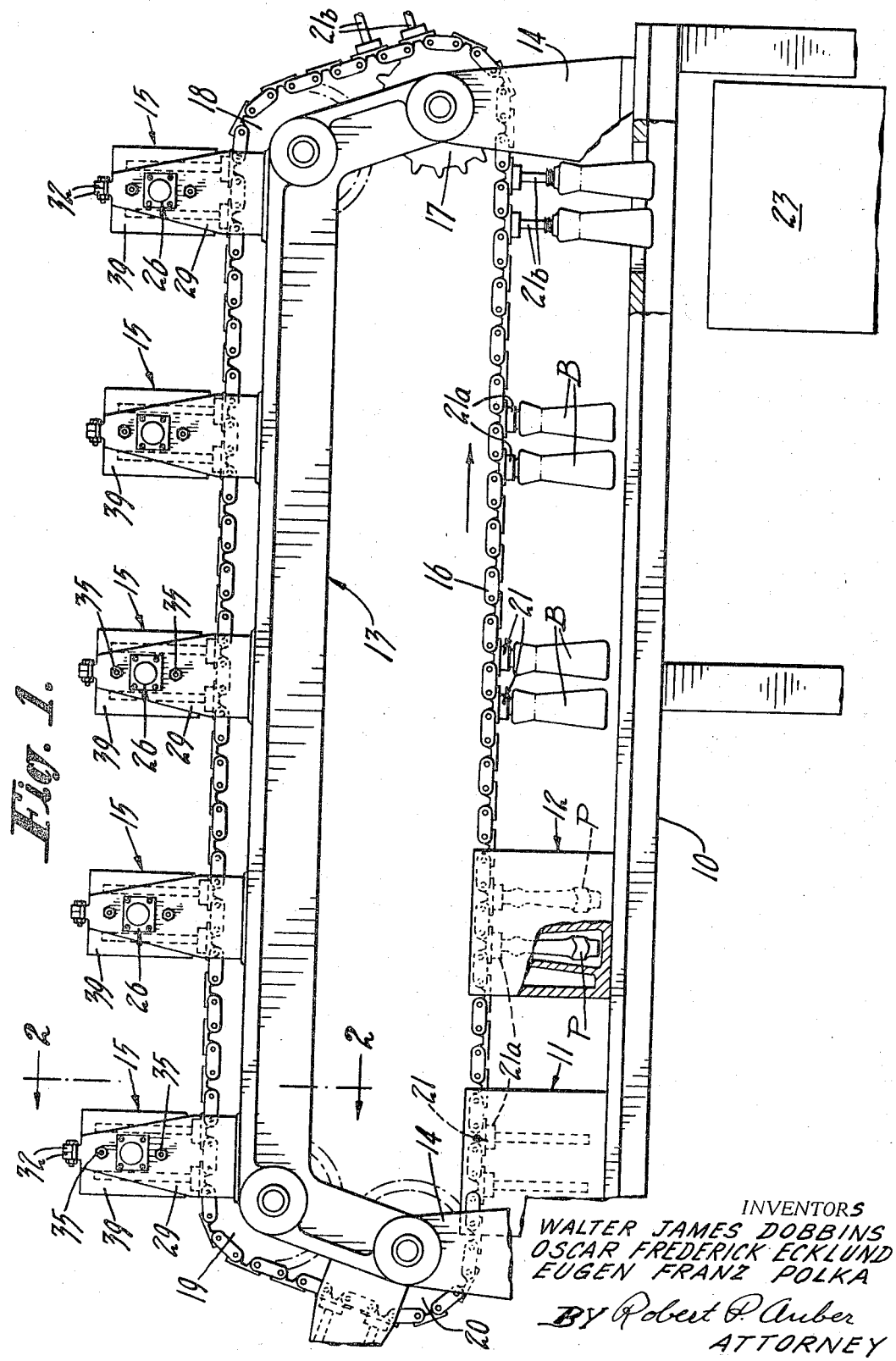
FIGURE 1 illustrates one arrangement of apparatus incorporating the present invention.
Figure 2:
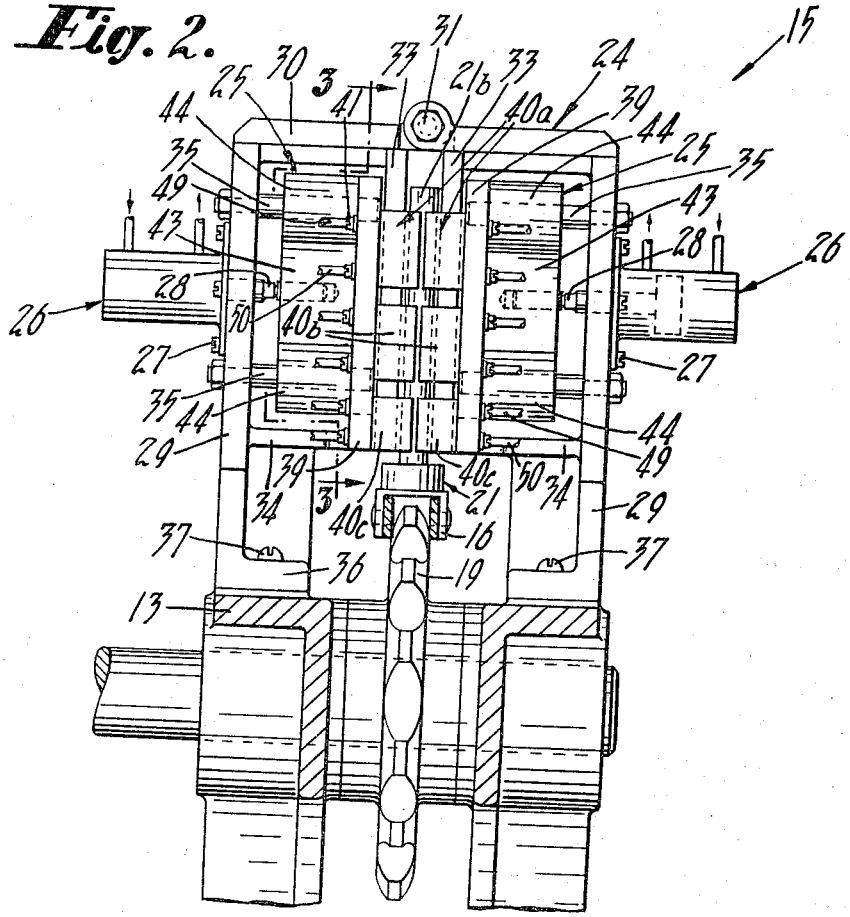
FIGURE 2 is an enlarged sectional view taken substantially along the line 2—2 of FIGURE 1.
Figure 3:
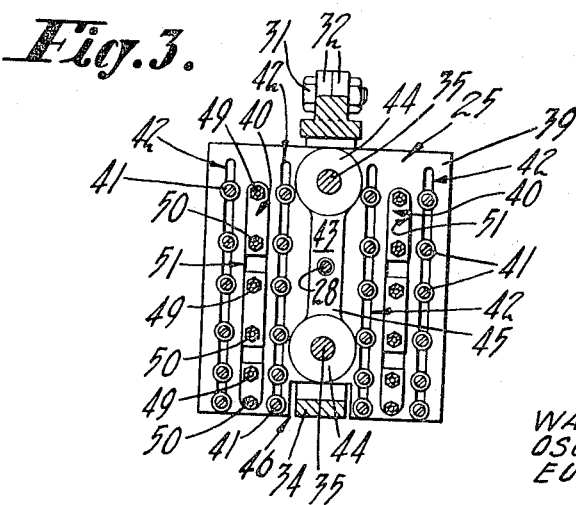
FIGURE 3 is a sectional view taken substantially along line 3—3 of FIGURE 2.

The preferred form of the invention, as illustrated in the drawings, is shown embodied in a typical bottle blowing machine of the intermittent motion type. By way of illustration and not limitation, the machine proper, as best illustrated in FIGURE 1, comprises a main frame 10, an injection station 11 and a blowing station 12 mounted to the main frame, a secondary frame 13 mounted above the main frame on supports 14, 14 and a plurality of tempering stations generally designated 15, mounted to the secondary frame parallel to and above the main frame.

Tempering stations 15 and the injection and blowing stations 11 and 12 define a closed path of travel constituting the work path of the machine as it undergoes each cycle of operation. A conveyor chain 16, running on sprockets 17, 18, 19 and 20 mounted to the secondary frame and intermittently driven by a suitable Geneva drive (not shown), serves as a work piece carrier through these various stations of the machine.

Mounted on conveyor chain 16 at uniformly spaced intervals are a plurality of core pin-thread plate assemblies generally designated 21, each comprising a thread or neck mold member 21a detachably affixed to chain 16 and a core pin member 21b secured concentrically of and perpendicularly to the neck mold. These assemblies are provided preferably in tandem or pairs, and are carried on chain 16 through the various stations of the blowing machine, first passing through the tempering stations 15, then into injection station 11 where a thermoplastic parison P is molded thereon in the conventional manner by means of a suitable injection mechanism (not shown), next into blowing station 12 where the parison P on each assembly 21 is inflated under fluid pressure to finished bottle shape B, and thereafter passed through a cooling environment, arriving finally at an ejection station 22 where the finished bottles B are stripped from their respective core pin-thread plate assemblies 21 into a hopper 23. The conveyor chain 16 then moves over the sprockets 17, 18 and into its return run over secondary frame 13, carrying the assemblies 21 intermittently into each of the tempering stations 15, the detail construction of which will now be described.

Referring to FIGS. 2–5, tempering station 15 is shown comprising a support truss generally designated 24, a pair of opposed, laterally reciprocable tempering elements generally designated 25, 25 operatively supported in the truss, and a corresponding pair of fluid cylinders 26, 26 externally mounted to the truss by screws 27 and connected to the tempering elements by rods 28, 28 to slidably translate them into and out of operative position. This arrangement is identical for each of the several tempering stations used in the machine.

Support truss 24 comprises a pair of upright, A-shaped plates 29, 29 bolted to frame 13 on opposite sides of the path of travel of chain 16, top cross arms 30, 30 integrally joined at the outer end of each to its respective upright plate and rigidly interlocked by a bolt 31 extending through aligned holes in enlarged, lapped inner ends 32, 32 of the cross arms, a pair of upstanding bars 33, 33 spaced on opposite side sof chain 16 a distance sufficient to permit passage of core pins 21b therethrough, these bars being integrally joined at their upper ends to an underlying rib on each cross piece 30 and to the each upright plate 29 at their lower end by trangular cross pieces 34, 34, and two sets of paired guide pins 35, 35 connected at their inner ends to upstanding bars 33, 33 and at their outer ends to upright plates 29, 29. This arrangement of integrally interconnected members constitutes a relatively strong, flexure-free structure for supporting the relatively moveable tempering elements 25, 25. Both upright plates 29, 29 are provided at their bottom end with inturned flanges 36, 36 which rests on frame 13 and are adjustably bolted thereto by bolts 37 extending through adjustment slots 38 cut in the flanges.

The two tempering elements 25, 25 on opposite sides of the truss 24 are of identical construction. Each comprises a mounting plate 39 disposed parallel to and between upright plate 29 and upstanding bar 33, a plurality of contact conductors 40 adjustably fixed to the inner face of the mounting plate by bolts 41 extending through four elongated, parallel vertical slots 42 provided therein, and a hub member 43 integrally joined to the outer face of the mounting plate. Hub member 43 is provided at its top and bottom ends with a pair of enlargements 44, 44 which are bored through to slidably accommodate the guide pins 35, 35, these enlargements being joined by a cross web 45 to which is connected the actuating rod 28 of fluid cylinder 26. Each plate 39 is notched or cut away as at 46 at its bottom edge in order to provide clearance for the innermost extension of cross piece 34 as the tempering element moves back and forth in its operative stroke.

As best shown in FIG. 5, the several conductors 40 on each mounting plate, here designated 40a, 40b and 40c for simplicity, are arranged in two parallel, vertical columns spaced apart a distance equal to the spacing between the two core pins 21b in each pair. Each conductor is positioned so as to be paired up with a corresponding one on the opposite support plate, thereby providing two sets of paired conductors adapted to move into enclosing engagement with the paired core pins 21b as the latter come to rest in the station 15. Conductors 40 are semicylindrically contoured on their interfaces as at 47 so as to conform substantially exactly to the outside surface of the core pin to be enclosed therein.

As is illustrated in FIG. 6, each contact conductor is hollowed out to provide an arcuate passage 48 which extends semicircularly through the conductor concentrically of its contoured interface 47. Communicating with each passage 48 are two conduits 49, 50, these conduits being, respectively, the inlet and outlet lines for circulating a suitable heat transfer medium through the passage. These conduits extend outwardly from the two rows of conductors 40 through elongated slots 51, 51 in mounting plate 39 and are connected, respectively, to separate supply manifolds $M_S$ and return manifolds $M_R$. The actual number of pairs of contact heater elements 40 to be employed will depend entirely upon the specific temperature profile to be imposed upon the core pins. In the embodiment illustrated, the three pairs of elements 40a, 40b and 40c in each of the two sets at every station is a specific arrangement adopted to effect thermal conditioning of the core pin over its tip, center and thread plate regions; i.e. a temperature gradient comprising three distinct temperature levels.

Separate circulation systems, designated $S_1$, $S_2$ and $S_3$ in FIG. 6, are provided for the three cooperating pairs of conductors 40. As shown schematically, the two inlet conduits leading into the top two conductors 40a, 40a on opposite sides of station 15 are connected to the same supply manifold $M_S$, and their two return conduits lead into a common return manifold $M_R$, constituting system $S_1$. The other two systems $S_2$ and $S_3$ for conductors 40b, 40b and 40c, 40c, respectively, are of identical arrangement with separate supply and return manifolds for each. In this manner, the several vertically spaced, paired conductors may be maintained at different temperature levels simply by maintaining the circulating medium in one system at a higher or lower temperature than in the next. Since an identical temperature gradient is to be imposed on both core pins 21b present in station 15 at any one time, it will be understood that each of the three circulation systems will be connected to and serve both parallel columns of paired conductors in the station.

A suitable heat transfer medium is circulated through each pair of contact conductors, an example being ethylene glycol which is preferred for its high heat capacity. The media used in the three independent circulating systems may be the same or dissimilar, depending on desired operation conditions, and are maintained at predetermined temperatures and at predetermined rates of flow through the respective conductors 40 to impose upon the respective portions of the core pin 21b a predetermined temperature profile in accordance with well-known heat transfer principles. That is, each of the three circulating systems is independently controlled to either add or extract heat from the tip end, center, and thread plate end portion of the core pin in accordance with the desired temperature profile to be imposed thereon. For example, the successful manufacture of a specific bottle configuration B of an organic plastic material and having the fairly complex geometry depicted in FIG. 1 called for an ideal core pin gradient as follows: 230° F. at the thread plate end; 280° F. in the center portion of the pin; and 205° F. at the tip end of the pin, this gradient having been found to be the optimum for the selected geometry of the parison P when molded from molten polyethylene at a stock temperature of approximately 445° F. and subsequently blown in a machine having particular cycle characteristics.

When using the bottle blowing machine illustrated in FIG. 1, at a blowing time cycle of 7.5 seconds, approximately 30 seconds of tempering time is available as the core pin-thread plate assemblies 21 traverse the return run of conveyor 16 and prepare to re-enter the injection station 11. By maintaining the appropriate contact conductors 40 in each respective tempering station 15 at that temperature corresponding to the desired gradient, it has been found that the actual temperature profile induced on the respective core pins 21b during the available tempering time of 30 seconds approaches to within better than ninety percent of the ideal profile, irrespective of the irregular and erratic temperature patterns found to exist in the core pins at the time of entering the tempering stations. In effect, then, maintaining the various contact elements at those temperatures calculated to give a desired or ideal gradient within a given time interval constitutes a practical system for adding or extracting heat from select regions of the core pin to bring those regions within acceptable proximity of the desired temperature profile found to produce bottle of the best quality.

There are certain advantages to the contact heater elements as hereinabove described over other types of heating systems, such as radiant heaters, flame or air jets, etc. For one thing, thermal conditioning by contacting conductors 40 is a stable type of operation whereby an increase in conditioning time only brings the core pins closer to ideal temperature instead of overheating or overcooling the pins as is encountered with radiant heaters, gas flames, or air jets. That is, by maintaining the respective contact conductors at those temperatures corresponding to the ideal temperature gradient, the various hot or cold spots on the respective core pins are corrected to a substantially ideal profile in the available tempering period, gradually, but without danger of overcorrection, which otherwise would have the opposite effect of adversely upsetting the temperature profile on the core pins so that they would be even further from the desired condition as they enter the injection station. Then, there is the added advantage that surface contact elements, unlike radiant heaters, flame or air jets which tend to transmit heat in a dissipated and unpredictable pattern, afford positive means for conditioning only those select surfaces of the core pin contacted by the elements so as to impose a distinctly defined profile onto predetermined surfaces in a controlled manner. For best results, conductors 40 are preferably of a material of high heat conductivity, such as aluminum or copper, to insure the rapid tranfer of heat to or from specified areas of core pins 21b which are normally hardened stainless steel or similar material of low heat conductivity. Moreover, the efficiency of contact heaters is not appreciably affected by core pin surface discoloration which may occur from one cause or another during the operation of the machine, a factor which disturbs the heat transfer characteristics of the core pin and makes controlled conditioning with radiation or flame jets difficult.

It is though that the invention and many of its attendant advantages will be understood from the foregoing description and it will be apparent that various changes may be made in the form, construction, and arrangement of parts of the apparatus mention herein and in the steps and their order of accomplishment of the method described herein, without departing from the spirit and scope of the invention or sacrificing all of its material advantages, the apparatus and method hereinbefore described being merely a preferred embodiment thereof.

We claim:

1. A method of thermally conditioning a mold core comprising the steps of positioning said core preparatory to receiving a preform into heat exchange relationship with a plurality of external heat transfer elements spaced apart at select increments relative to the longitudinal axis of said core and maintaining each of said elements at different temperatures for a predetermined period of time to impose upon corresponding peripheral surfaces of said core a thermal gradient, and separating said core and elements from said heat exchange position for subsequent formation of a preform on said core.

2. A method of thermally conditioning a mold core comprising the steps of contacting select peripheral surfaces of said core with a plurality of external annular heat conductive elements correspondingly spaced relative to the longitudinal axis of said core, preparatory to molding an article thereon maintaining said elements at different temperatures for a period of time to impose on said select surfaces temperatures defining a thermal gradient, and separating said core and elements for subsequent molding of said article on said core.

3. A method of thermally conditioning a mold core preparatory to molding a thermoplastic resin article thereon comprising the steps of passing said core intermittently through a series of heat transfer stations and subjecting select peripheral, axially spaced surfaces of said core to independently controllable thermal conditions for a period of time in each station to impose on said core, in aggregate effect, a thermal gradient.

4. A method of forming hollow articles of an organic plastic material comprising the steps of thermally conditioning a mold core by providing heat exchange elements external of said core, placing said elements and said core into juxtaposed heat exchange relationship to impose on select peripheral, axially spaced surfaces of said core independently controllable thermal conditions defining a temperature gradient, separating said core and said elements from said juxtaposed heat exchange relationship, then forming on said thermally conditioned core a hollow, tubular preform by fluid pressure, and expanding said preform to finished article shape.

5. The manufacture of blown bottles of thermoplastic resin material by an injection-blow process, comprising the steps of passing a series of mold cores sequentially through an injection station and a blowing station, injection molding a parison on each of said cores at said injection station, inflating said parisons under fluid pressure in said blowing station into finally shaped bottles, stripping said bottles from said cores, and thermally conditioning said cores in the return interval between the blowing station and the injection station, said thermal conditioning comprising placing said cores into juxtaposed heat exchange relationship with external heat exchange elements to impose on said cores a thermal gradient, and separating said core and said elements from said juxtaposed heat exchange relationship.

6. The method of claim 5 wherein said cores are advanced in intermittent sequence through said injection and blowing stations and certain ones of said cores are thermally conditioned in the interval that other cores are present in said stations.

7. The method of claim 5 wherein said thermally conditioning step is accomplished by contacting select peripheral, axially spaced surfaces of each of said cores with a plurality of said heat exchange elements for a period of time to impose thereon temperatures defining said thermal gradient.

8. The method of claim 7 wherein said heat exchange elements are independently controlled at different temperatures defining said thermal gradient.

9. The manufacture of blown bottles of thermoplastic resin material by an injection-blow process, comprising the steps of passing a series of mold cores sequentially through an injection station and a blowing station, injection molding a parison on each of said cores at said injection station, inflating said parisons under fluid pressure in said blowing station into finally shaped bottles, stripping said bottles from said cores, and thermally conditioning said cores in a series of heat transfer stations disposed along the return path of travel of said cores between the blowing station and the injection station to impose thereon a thermal gradient.

References Cited by the Examiner
UNITED STATES PATENTS

| 2,317,763 | 4/1943 | Hall | 18—5 |
| 2,985,915 | 5/1961 | Winstead. | |
| 3,011,216 | 12/1961 | Gussoni | 264—97 |
| 3,125,619 | 3/1964 | Miller. | |
| 3,191,225 | 6/1965 | Polka | 264—97 |

ROBERT F. WHITE, *Primary Examiner.*

R. B. MOFFITT, *Assistant Examiner.*